United States Patent [19]

Ohashi et al.

[11] Patent Number: 5,541,637

[45] Date of Patent: Jul. 30, 1996

[54] IMAGE EXPOSURE APPARATUS WITH COMPENSATION FOR VARIATIONS IN SCANNING RATE

[75] Inventors: Tsuyoshi Ohashi, Hashima; Shinichi Hirahata, Kakamigahara, both of Japan

[73] Assignee: Brother Kogyo Kabushiki Kaisha, Nagoya, Japan

[21] Appl. No.: 99,560

[22] Filed: Jul. 30, 1993

[30] Foreign Application Priority Data

Jul. 30, 1992 [JP] Japan .................................. 4-224688
Jul. 30, 1992 [JP] Japan .................................. 4-224691

[51] Int. Cl.$^6$ ............................................. H04N 1/21
[52] U.S. Cl. ........................................ 347/248; 347/250
[58] Field of Search .................................. 346/108, 160, 346/107 R, 762, 1.1; 347/248, 249, 250, 234, 235

[56] References Cited

U.S. PATENT DOCUMENTS 3,848,087  11/1974  Carrell .................................. 346/108
4,788,560  11/1968  Miura .................................... 346/108

Primary Examiner—Mark J. Reinhart
Attorney, Agent, or Firm—Oliff & Berridge

[57] ABSTRACT

An image exposure apparatus for eliminating discrepancies between the positions in the main scanning direction desired to be exposed and actually exposed by a laser beam. This may be achieved by controlling the rotational speed of the polygon mirror based on accurate rotation information. A first and second beam detectors for detecting the scanning laser beam in the main scanning direction are positioned at either side of the region of a recording medium where an image is to be formed. These detectors output signals upon detecting the laser beam. The scanning speed in the main scanning direction is calculated based on these signals. Further, deviation in speed in the main scanning direction is obtained from these signals. Rotational speed and phase information obtained about the polygon mirror using a clock signal is added to scanning speed deviation to control rotational speed of the polygon mirror. The variation in rotation of the polygon mirror may be compensated for by modulating frequency of an image clock signal according to the variation in scanning speed of the laser beam. Discrepancies may also be eliminated by timing the image signals that modulate the laser beam to compensate for variations in the speed of the polygon mirror.

11 Claims, 10 Drawing Sheets

IMAGE EXPOSURE APPARATUS WITH COMPENSATION FOR VARIATIONS IN SCANNING RATE

BACKGROUND OF THE INVENTION

1. Field of the Invention

The present invention relates to an image exposure apparatus which repeatedly scans according to the rotation of a polygon mirror a photosensitive medium with a light beam, such as a laser beam, to modulatingly expose the photosensitive medium according to an image signal. More particularly, the invention relates to an image exposure apparatus having means for correcting variation in rotation of the rotating polygon mirror.

2. Description of the Prior Art

As shown in FIG. 1, a conventional image exposure apparatus used in a color copy machine includes a rotatable cylindrical drum 50 around which are positioned a fixer/paper discharger 56, a paper supplier 51, a charger 52, a laser scanner 53, a developing agent bearer 54, and a discharger 55. The developing agent bearer 54 stores yellow 54Y, magenta 54M, cyan 54C, and black 54K developing agent. In an image exposure apparatus constructed in this way, first the paper supplier 51 supplies a sheet of photosensitive paper 57 which wraps onto the outer surface of the drum 50 with the rotation of the drum 50. Then, the sheet of photosensitive paper 57 is uniformly charged at its surface as further rotation of the drum 50 carries it past the charger 52. The charged photosensitive paper 57 is then exposed to light from the laser scanner 53 according to yellow image information of an image to be copied, forming an electrostatic latent image on the surface of the photosensitive paper 57 that represents yellow color of the image to be copied. Still further rotation of the drum carries the sheet of photosensitive paper 57 to the developing agent bearer 54 where yellow developing agent 54Y attaches to its surface where the electrostatic latent image was formed by exposure to light from the laser scanner 53. Then, the charge of the sheet of photosensitive paper 57 is removed by the discharger 55, completing the developing of the first color. This process is repeated for each color developing agent stored in the developing agent bearer 54. That is, the sheet of photosensitive paper 57 is uniformly charged, exposed to light according to the image information for each color, and developed for each color until a full color image is formed. Then the paper fixer/discharger 56 fixes the color image to the photosensitive paper 57 and discharges the photosensitive paper 57 from the color copy machine.

The positioning of components in the vicinity of the drum 50, including those of laser scanner 53, will be described in more detail while referring to FIG. 2. As is well known in the art, the laser scanner 53 disposed opposing the drum 50 includes a laser diode 40, a collimator lens 41, a polygon mirror 42, and an f-θ lens 43. The collimator lens 41 collates laser light produced by the laser diode 40 into a substantially parallel beam, that is, a laser beam. The polygon mirror 42 disposed in the path of the laser beam is rotated about its axis by a polygon motor 44. The rotation of the polygon mirror 42 scans the parallel beam in a main scanning direction indicated by arrow A. The polygon motor 44 outputs an FG signal containing information on its speed and angular position (phase) to a polygon motor control circuit 70. The polygon motor control circuit 70 slows down or speeds up the polygon motor 44 in accordance with a clock signal.

To a flat side of the drum 50 is provided a rotation gear engaged with a reduction gear 63 of a drum motor 61. The drum motor 61 is connected to the output of a drum motor control circuit 62. The drum motor control circuit 62 drives the drum motor 61 to rotate at a constant angular velocity by the aid of clock signals. The drum motor 61 rotates its speed reduction gear 63 which in turn causes the drum 50 to rotate. The rotation of the drum 50 moves the photosensitive paper 57 attached to the surface thereof at right angles to the scanning direction of the polygonal mirror 42 so that the surface of the photosensitive paper 57 is also scanned in an auxiliary direction indicated by arrow B. A beam detector 71 is disposed at the edge of the drum 50 where scanning in main scanning direction begins. The beam detector 71 is temporarily irradiated by the laser beam directly before scanning the region of the photosensitive paper 57 where an image is to be formed, hereinafter referred to as an image region.

The construction of the polygon motor control circuit 70 will be explained while referring to FIG. 3. The polygon motor control circuit 70 includes a speed deviation detector 46, a phase deviation detector 47, a deviation addition circuit 72, a compensator 73, and a driver 38. The FG signal from the polygon motor 44 and a clock signal are inputted to, and compared at, the phase deviation detector 47 and the speed deviation detector 46 to determine the phase deviation and the speed deviation, respectively. The phase deviation and the speed deviation are inputted to the deviation addition circuit 72, added, and then outputted as a rotation deviation signal to the compensator 73. The output from the compensator 73 is inputted to the driver 38 which applies an electric current or voltage controlled according to the output from the compensator 73 to a drive coil (not shown) of the polygon motor 44.

The polygon motor 44 is thus PLL (phase-locked loop) controlled with this polygon motor control circuit 70 to rotate the polygon mirror 42 at the predetermined rotational speed based on the clock signal. Laser light deflected by the polygon mirror 42 is collimated by the f-θ lens 43 into a laser beam that scans the surface of the photosensitive paper 57 on the drum 50 at a given linear speed in the main scanning direction.

Next, the construction of a conventional exposure signal processor will be explained while referring to FIG. 4. The laser diode 40 generates laser light to expose desired positions on the photosensitive paper 57 during scanning at timing controlled by the exposure signal processor based on when the beam detector 71 detects a laser beam. First, image data of an object to be copied is inputted to a D/A convertor 74 and converted into an exposure intensity signal (a) proportional to the intensity of exposure required to form a latent image. In a separate operation, the beam detector 71 generates a pulse-shaped beam detected signal (b) (hereinafter referred to as BD signal) each time it detects the laser beam at the start of each scan in the main scanning direction. The BD signal is inputted to a triangular wave generator 75 which generates a triangular wave using a crystal oscillator (not shown). The phase of the triangular wave (c) generated in the triangular wave generator 75 is adjusted to coincide with the phase of the BD signal to produce a triangular wave (c) with extremely precise and stable frequency. The exposure intensity signal (a) and the triangular wave (c) are inputted to the comparator 76, and converted into a pulse signal (d) with a duty ratio proportional to the image data. That is, areas of the image to be copied with high optical density result in a pulse signal (d) with a high duty ratio., The duty pulse signal is inputted to the laser driver 77 which causes the laser diode 40 to generate laser light accordingly. The laser beam is scanned in the main scanning direction by the rotation of the polygon mirror 42, alternately exposing and not exposing the photosensitive paper 57 according to the image data.

Modulation of the laser beam is started dependent on timing of the BD signal (generated upon detection of the laser beam by the beam detector 71 directly before scanning in the main scanning direction begins). Therefore, the photosensitive paper 57 is exposed by the laser beam during scanning in the main scanning direction at desired positions even if the polygon mirror 42 rotates with slight unevenness or if inter-surface angle or tilt of reflective surfaces on the polygon mirror 42 vary slightly.

However, there has been known a problem with conventional image exposure apparatuses in that information on the phase and rotational speed of the polygon is based on changes in the polarity of the rotor of the polygon motor, a signal (an encoder output signal) being produced accordingly, and is often imprecise because the polarization of the rotor is sometimes unclear and because only a weak signal can be obtained. Therefore regardless of how extreme the efforts to stably rotate the polygon mirror or steadily maintain the main scanning speed, because the rotation information from the polygon motor is imprecise and the polygon mirror rotates with varying speed, the laser beam exposes the photosensitive paper at imprecise positions. Rotation variation is generally about 0.02% in polygon motors controlled to rotate at a uniform speed and 0.01% even in polygon motors using highly precise air bearings. Even mounting a highly precise speed detector to the polygon mirror to more precisely detect rotational variation does not insure reduced variation because the speed detector is often imprecisely mounted.

Because modulation of the laser beam is started according to the BD signal, the photosensitive paper can be exposed at precisely the desired positions directly after start of each scanning line in the main scanning direction. However, as scanning and modulation of the laser beam progress after the BD signal, slight variation in rotation of the polygon motor prevents accurately exposing positions toward the end of each line in the main scanning direction. Therefore providing high resolution images becomes impossible.

Further, because rotational variation differs during the charging, exposure, and developing processes for yellow tonor, magenta tonor, and cyan tonor, the colors are applied and overlapped imprecisely which can alter the color or the optical density of the copied image from that of the original.

SUMMARY OF THE INVENTION

It is therefore, an object of the present invention to solve the above-described problems, and accordingly it is an object of the invention to provide an image exposure apparatus wherein variation in rotation of a polygon mirror is precisely detected and compensated for to provide high resolution images.

In accordance with one aspect of the invention, light is deflected in the main scanning direction by a deflecting element. Rotation drive means rotatingly drives the deflection element and continuously changes deflection direction of the light. Rotation deviation detection means detects rotational deviation in the rotation drive. Main scanning speed deviation detection means detects deviation in speed in the main scanning direction during exposure. Rotation control means controls rotational speed of the deflection element based on the deviation in the speed in the main scanning direction or deviation in the speed in the main scanning direction and deviation in the rotational speed of the deflection element. In this way, speed in the main scanning direction is extremely uniformly controlled and positions exposed in the main scanning direction are precise so high-quality images can be obtained.

Preferably, the main scanning speed deviation detection means is a beam detector that detects the timing of the start of exposure.

In accordance with another aspect of the invention, scanning speed detection circuit detects variation in the scanning speed of the laser beam in the main scanning direction by measuring the frequency of the laser beam which scanningly exposes the recording medium. Clock modulation circuit modulates the frequency of an image clock signal with the detected variation in the scanning speed of the laser beam in the main scanning direction. The modulated frequency of the image clock signal is the frequency according to the variation in the scanning speed of the scanning laser beam. Because the image signal is read and the laser beam is modulated based on the timing of the image clock signal, the position of dots formed on a photosensitive body are uniform and do not change with variation in the scanning speed.

For this reason, even if photosensitive drum is repeatedly exposed to form a full-color image, because exposure positions of each color overlap precisely, a high quality full color image can be formed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
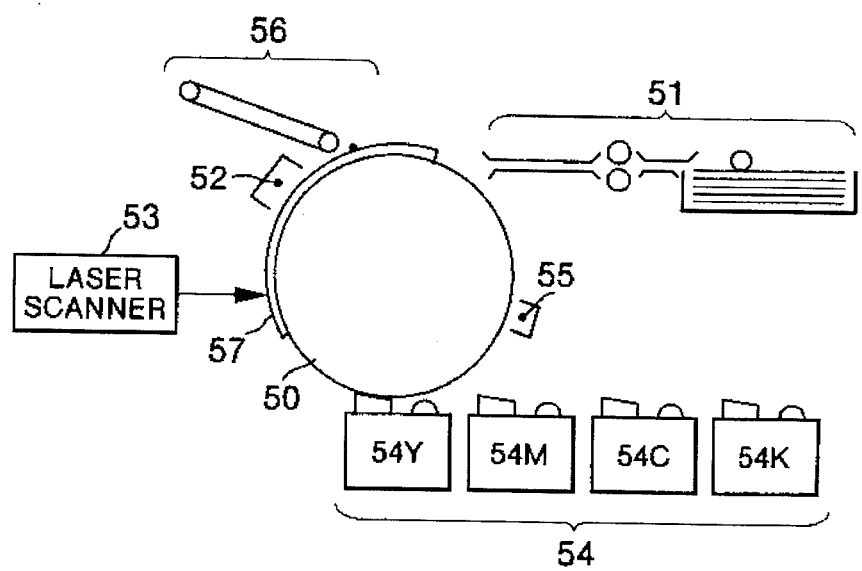
FIG. 1 schematically shows a conventional image exposure apparatus.
Figure 2:
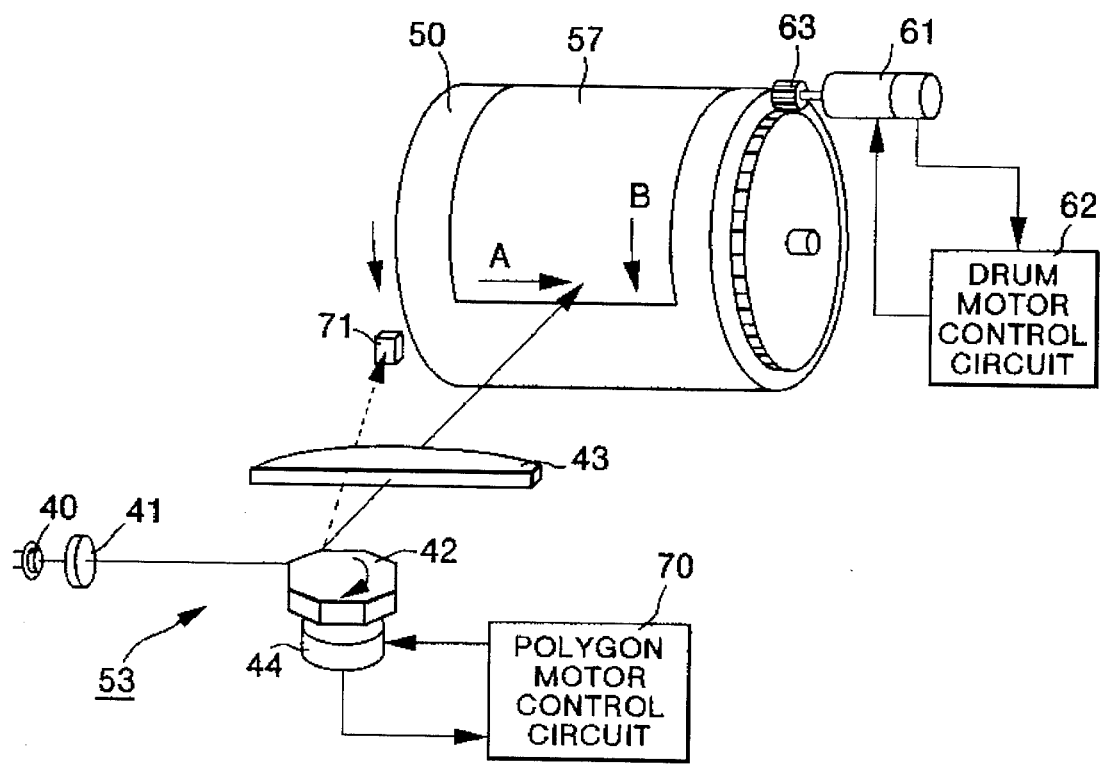
FIG. 2 is a perspective view showing positional detail of components in the conventional image exposure apparatus shown in FIG. 1.
Figure 3:
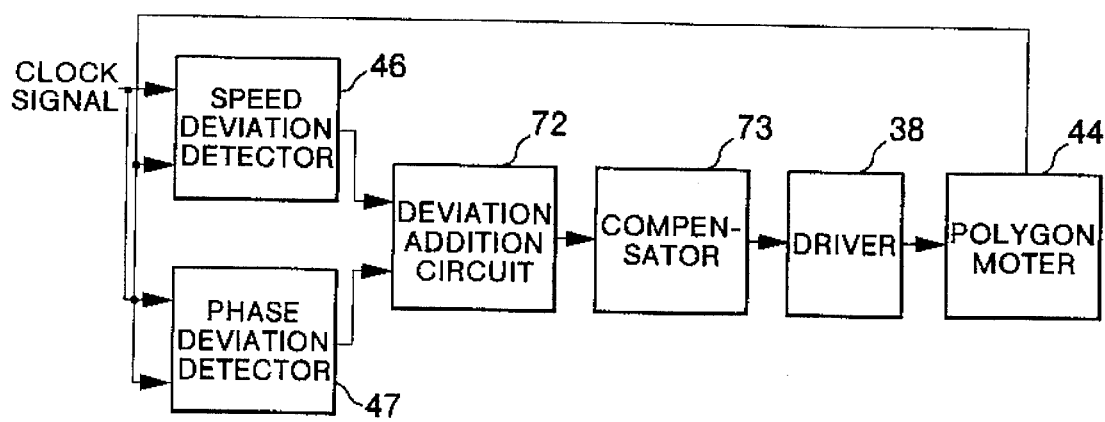
FIG. 3 is a block diagram showing a conventional polygon motor control circuit.
Figure 4:
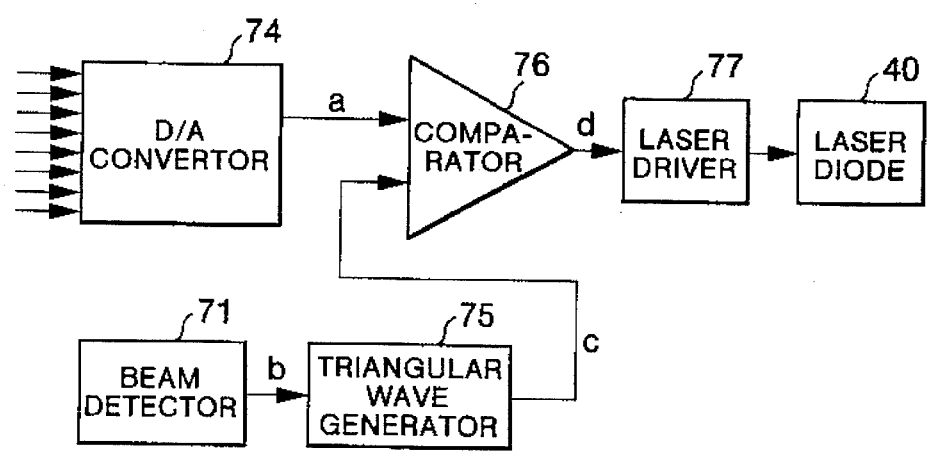
FIG. 4 is a block diagram showing a conventional exposure signal processor.
Figure 4:
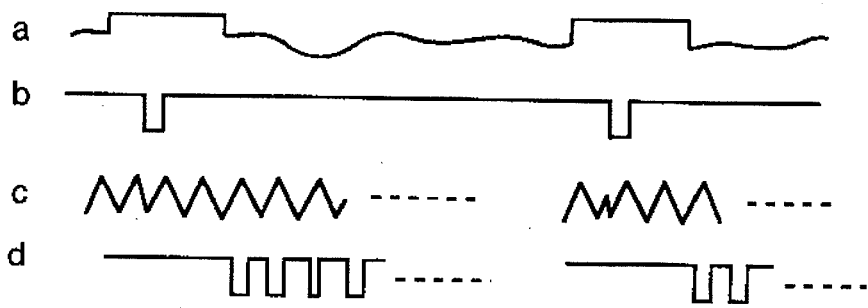
Figure 5:
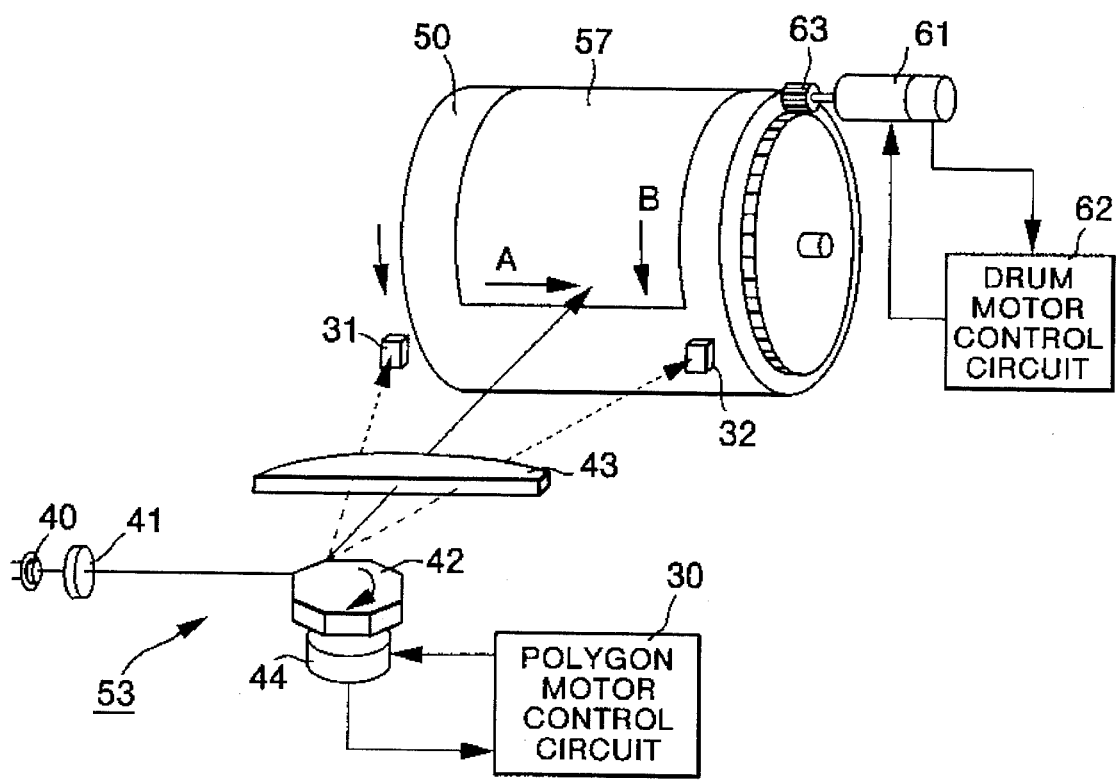
FIG. 5 is a perspective view showing an image exposure apparatus according to a first preferred embodiment of the present invention.

An image exposure apparatus according to a first preferred embodiment of the present invention will be described while referring to FIGS. 5 through 8. The structure and general operation of the color image forming device and structure of the exposure signal processing device according to the first preferred embodiment of the present invention are similar to those described above for the conventional art and so will be omitted from this explanation. FIG. 5 shows components in the vicinity of the laser scanner 53 and the drum 50. The laser scanner 53 includes a laser diode 40, a collimator lens 41, a polygon mirror 42, an f-θ lens 43, and a polygon motor 44 with conventional positioning. The polygon mirror 44 is connected to a polygon motor control circuit 30 which controls the rotational speed of the polygon mirror 42. The drum motor 61, the drum motor control circuit 62, and the speed reduction gear 63 in the vicinity of the drum 50 are also positioned as in the conventional art. The drum 50 is constructed to rotate at a uniform rotational speed based on a clock signal. Additionally, a first beam detector 31 is disposed where scanning in the main scanning direction begins and a second beam detector 32 is disposed where scanning in the main scanning direction ends. That is, these beam detectors are positioned so as to receive laser light directly before and directly after scanning begins of the image region. The polygon mirror 42 serves as a deflecting element, and the polygon motor 44 as a rotation drive means, of the present invention.

Figure 6:
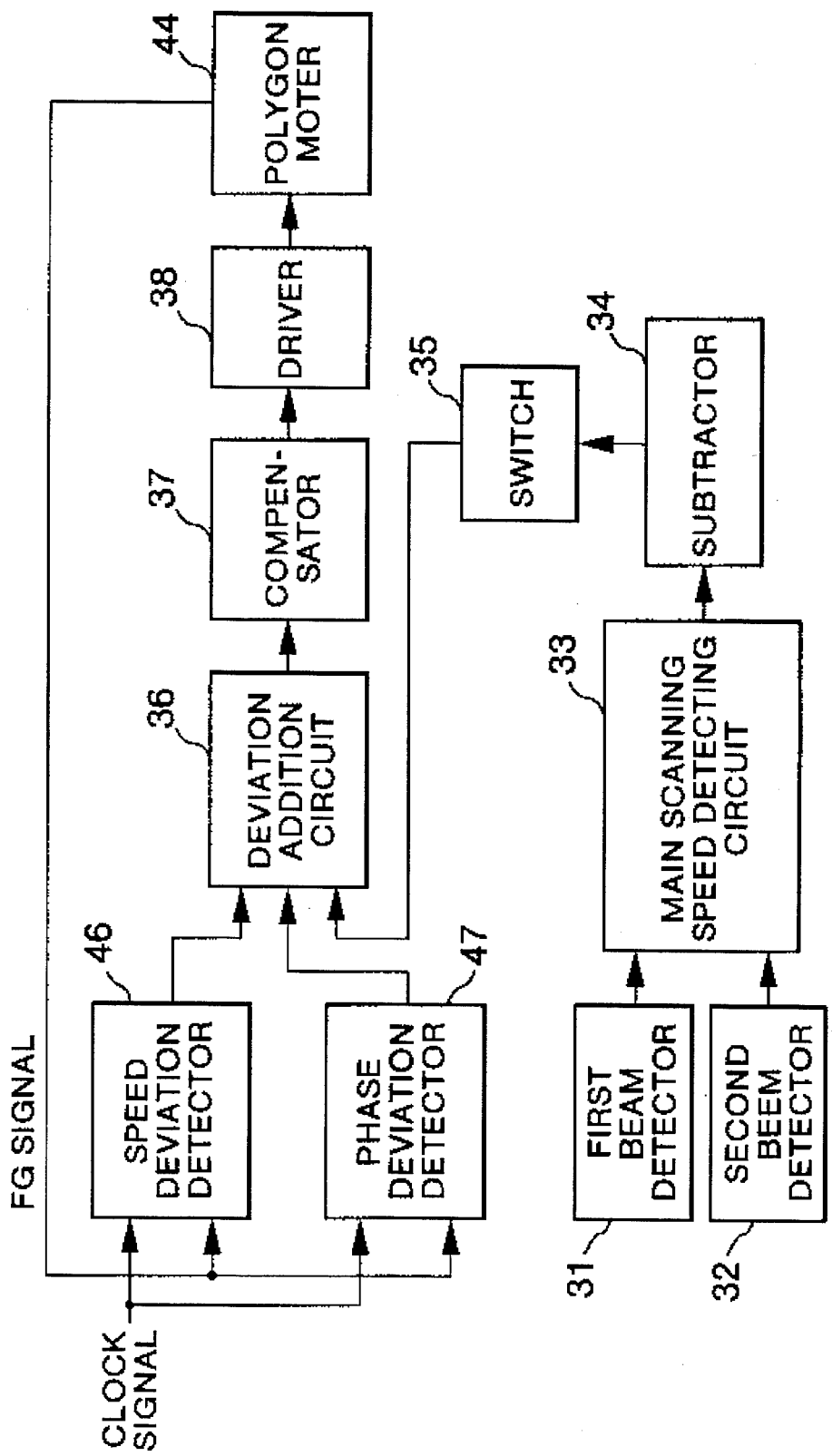
FIG. 6 is a block diagram of a polygon motor control circuit according to the first preferred embodiment of the present invention.

The construction of the polygon motor control circuit 30 will be explained while referring to FIG. 6. The FG signal of the polygon motor 44 and an extremely precise clock signal generated using a crystal oscillator are inputted to the speed deviation detector 46 and the phase deviation detector 47. Beam detected (BD) signals from the first and second beam detectors 31 and 32 are inputted to the main scanning speed detecting circuit 33. The output of the main scanning speed detecting circuit 33 is inputted to a subtractor 34 which in turn outputs its output to a switch 35. The output from the speed deviation detector 46, the phase deviation detector 47, and the switch 35 are inputted to, and added at, the deviation addition circuit 36 which in turn outputs a signal accordingly to a compensator 37. The output from the compensator 37 is amplified by the driver 38 and applied to the polygon motor 44. The rotation deviation detector of the first preferred embodiment includes the speed deviation detector 46 and the phase deviation detector 47, a main scanning speed deviation detecting means includes the first and second beam detectors 31 and 32, the main scanning speed detecting circuit 33 and the subtractor 34, and a rotation control means includes the deviation addition circuit 36 and the compensator 37.

Figure 7:
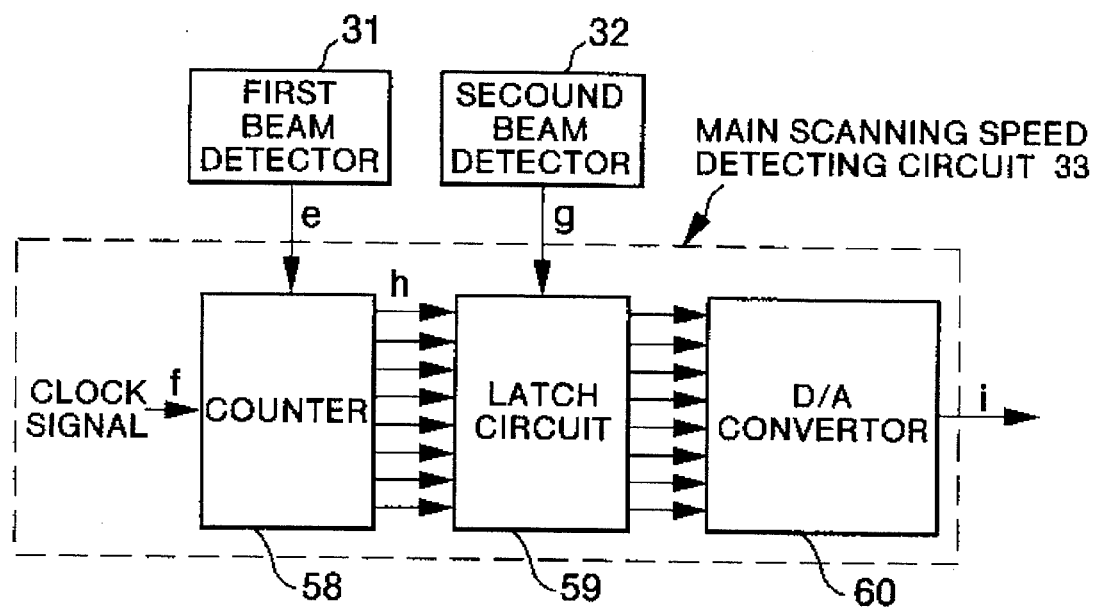
FIG. 7 is a block diagram showing a main scanning speed detecting circuit of the polygon motor control circuit shown in FIG. 6.
Figure 7:
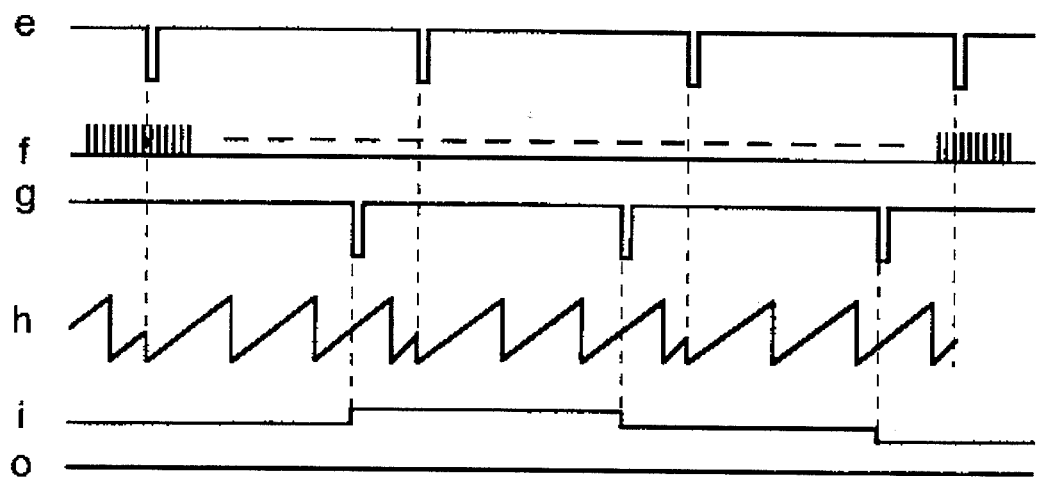

The main scanning speed detecting circuit 33 will be explained while referring to FIG. 7. The counter 58 has a reset input connected to the output from the first beam detector 31 and a clock input connected to the output of the high frequency clock. The output of the counter 58 is connected to the input of a latch circuit 59 which also receives input from the second beam detector 32. The output of the latch circuit 59 is connected to the input of a D/A converter 60. The counter 58 resets to zero upon receipt of the BD signal (e) from the first beam detector 31 and the counter 58 begins counting the clock signals (f) from the clock. When the BD signal (g) from the second beam detector 32 is inputted to the latch circuit 59 as a latch signal, the latch circuit 59 latches the number of clock pulses counted at the counter 58. The latched number is converted to voltage values (i) by a D/A converter 60. That is, the main scanning speed detecting circuit 33 converts the clock count number data counted from when the light received signal from the first beam detector 32 is inputted to the counter 58 to when the light received signal from the second beam detector 32 is inputted to the latch circuit 59 into an analog signal and outputs it. Because the distance between the two beam detectors divided by the time the scanning beam takes to travel from the first beam detector 31 to the second beam detector 32 equals the scanning speed, a signal that changes nearly rectilinearly can be obtained regardless of slight fluctuations in speed.

Next, the operation of the image exposure apparatus according to the first preferred embodiment of the present invention will be explained while referring to FIGS. 5 through 7. Rotation of the polygon mirror 44 begins when a sheet of photosensitive paper 57 is supplied to the drum 50. The FG signal of the polygon motor 44 is inputted to the speed deviation detector 46 and the phase deviation detector 47 of the polygon motor control circuit 30. The polygon motor 44 is feedback controlled based on the speed deviation signal outputted from the speed deviation detector 46 and the phase deviation signal outputted from the phase deviation detector 47. At this time the laser diode 40, which produces the laser beam, is OFF because the signal outputted by the first beam detector 31 is also used as a BD signal and irradiation timing of the laser diode 40 is controlled with the BD signal as the standard. The switch 35 is also OFF and the main scanning speed deviation signal is not yet applied to the deviation addition circuit 36.

With further rotation of the drum 50, the sheet of photosensitive paper 57 passes by the charger (not shown) where it is evenly charged. When the sheet of photosensitive paper 57 approaches the laser scanner 53, the laser diode 40 irradiates, the laser beam begins scanning in the main scanning direction by rotation of the polygon mirror 42, and the switch 35 is turned ON. When the switch 35 is turned ON, rotation of the polygon mirror 42 causes the laser beam to scan a row starting at the first beam detector 31, crossing over the image region of the photosensitive paper 57, and finishing at the second beam detector 32. The laser diode 40 irradiates according to the image signal at timing set by the BD signal when exposing the image region of the photosensitive paper 57, but otherwise irradiates at a set intensity. Each time the second beam detector 32 inputs a BD signal to the latch circuit 59, the latch circuit 59 latches the number of clock pulses counted at the counter 58 since the counter 58 previously received input of a BD signal from the first beam detector 31. That is, data corresponding to the main scanning speed is obtained with every scan in the main scanning direction. The D/A converter 60 converts the information latched in the latch circuit 59 into an analog voltage value (main scanning speed deviation signal) and outputs it to the subtractor 34.

The subtractor 34 obtains a signal representing any deviation in the main scanning speed. Because the switch 35 is ON when the laser irradiates, the deviation addition circuit 36 adds the speed deviation signal, the phase deviation signal, and the main scanning speed deviation signal to produce a deviation signal for Controlling the polygon motor 44. Here, values such as the addition rate of the speed deviation signal, the phase deviation signal, and the main scanning speed deviation signal, and the gain of the entire control loop are experimentally determined. When the entire image region of the photosensitive paper 57 is appropriately exposed to the laser after repeated rotation of the polygon mirror 42 in synchronization with further rotational movement of the drum 50, the laser diode 40 and the switch 35 are simultaneously turned OFF so that the polygon motor 44 is controlled only by deviation signals from the speed deviation detector 46 and the phase deviation detector 47 when photosensitive paper 57 is not being exposed.

As an example, in an image exposure apparatus according to the present invention with line scan interval, that is, interval between when the first beam detector 31 receives light and when the second beam detector 32 receives light, of 1 ms, and clock frequency of 100 MHz, variation in the speed of the main scanning direction can be detected at minimal resolutions of 0.001% and can be controlled to 0.002% (at peaks) or less. That is, by detecting the actual scanning speed of the laser beam in the main scanning direction and controlling the polygon mirror 42 and the polygon motor 44 accordingly, the laser beam can scan the photosensitive paper 57 in the main direction with an extreme minimal of variation, thus exposing the photosensitive paper 57 at desired positions.

An image exposure apparatus according to the first embodiment of the present invention can be used to produce high-quality images wherein the exposure positions are extremely precise in the main scanning direction. Control in the main scanning direction can be extremely uniformly maintained by providing a rotation deviation detection means which detects the deviation in a rotation drive means, that drives rotation of a deflector that deflects light in the main scanning direction, and a main scanning direction speed deviation detection means which detects the main scanning speed deviation of the scanning beam during exposure, and by basing control of the rotational speed of the deflector on either the information obtained by the main scanning speed deviation detection means or the main scanning speed deviation detection means and the rotation deviation detection means.

Figure 9:
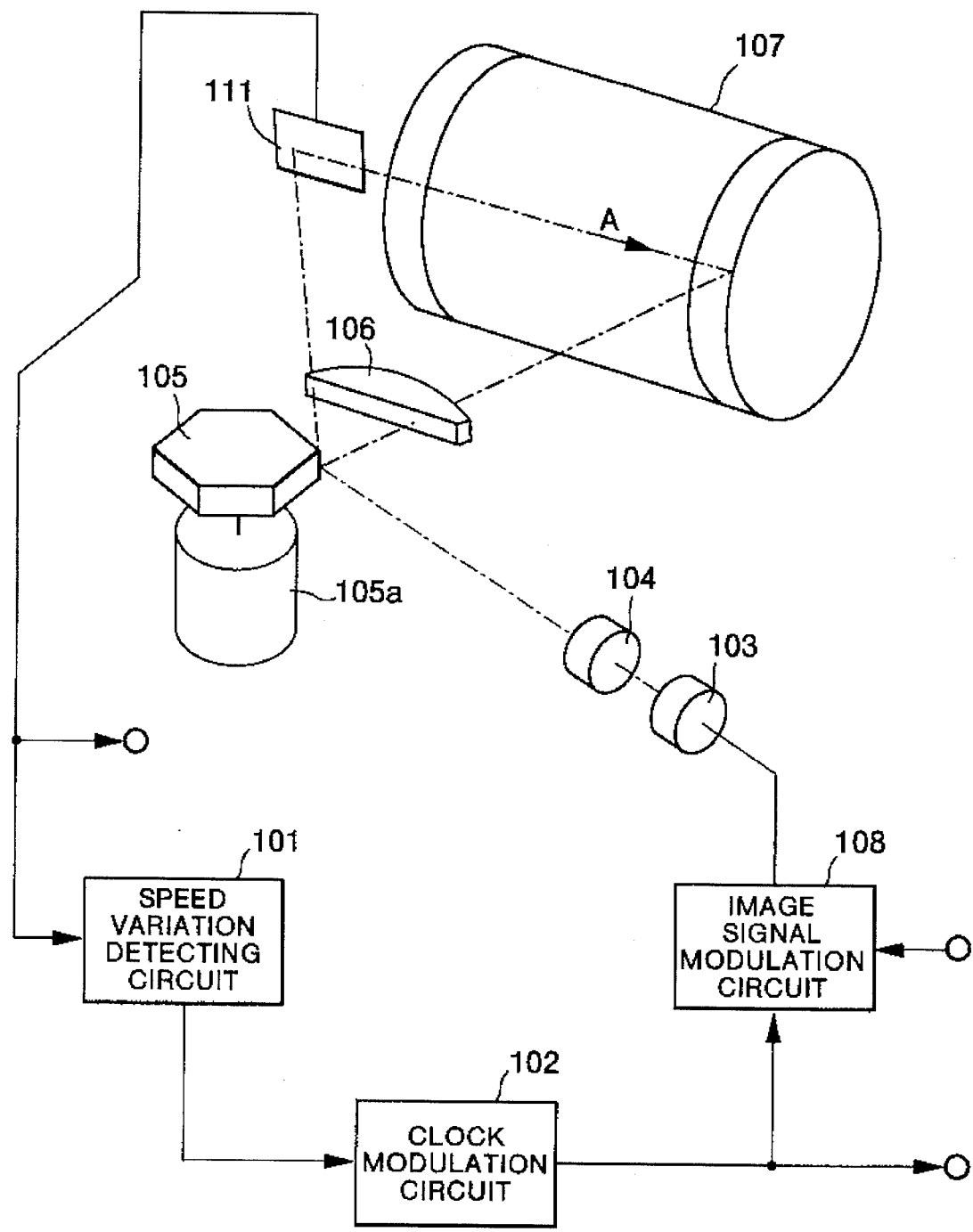
FIG. 9 schematically shows an image exposure apparatus according to a second preferred embodiment of the present invention.

An image exposure apparatus according to a second preferred embodiment .of the present invention will be described while referring to the FIGS. 9 through 12. As shown in FIG. 9, an image exposure apparatus according to the second preferred embodiment includes a photosensitive drum 107 and a scanning exposure means. The photosensitive drum 107 is rotated about its axis, that is, in an auxiliary scanning direction, by a drive means (not shown). The scanning exposure means includes a speed variation detecting circuit 101 connected to a beam detection circuit 111 provided adjacent to the photosensitive drum 107, a clock modulation circuit 102 connected to the output of the speed variation detecting circuit 101, an image signal modulation circuit 108 connected to the output of the clock modulation circuit 102, a semiconductor laser 103 electrically connected to the image signal modulation circuit 108, a collimator lens 104, a rotating polygon mirror 105 rotatingly driven by a motor 105a, and an f-θ lens 106. The scanning exposure means is for irradiating the photosensitive drum 107 in a main scanning direction with a laser beam modulated according to an image signal. The speed variation detecting circuit 101 detects variation in the scanning speed using a beam detection signal. The clock modulation circuit 102 modulates an image clock signal according to variation detected in the scanning speed. The image signal modulating circuit 108 modulates a signal that drives the semiconductor laser 103 according to an image signal. The rotating polygon mirror 105 scans the photosensitive drum 107 with the laser beam. The scanning exposure means serves as an exposure portion of an electrophotographic image forming apparatus. The variation detecting circuit 101 receives input of a beam detected (BD) signal from the beam detection circuit 111. The BD signal is used to set timing for reading data stored in a memory or information from an original image to be copied.

Figure 10:
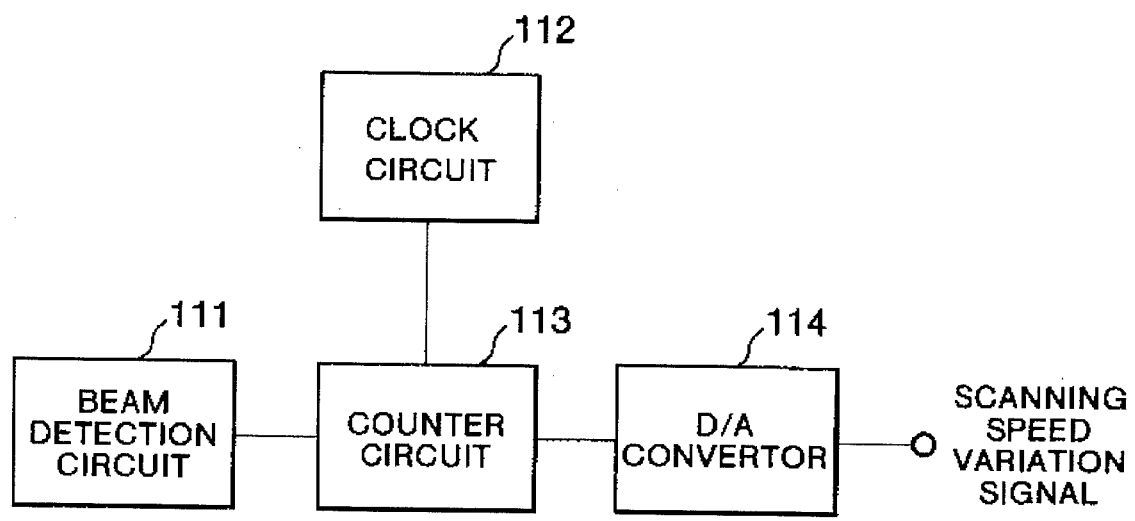
FIG. 10 shows a speed variation detecting circuit of the image exposure apparatus shown in FIG. 9.

Next, the speed variation detecting circuit 101 according to the second preferred embodiment will be explained in detail while referring to FIG. 10. The speed variation detecting circuit 101 includes the beam detection circuit 111, a clock circuit 112, a counter circuit 113, and a D/A converter circuit 114. The counter circuit 113 is a down-counter which starts from an appropriately high initial number and counts down with each inputted pulse from the clock circuit 112 for determining the cycle of the BD signal and detecting scanning speed variation. The D/A converter circuit 114 converts the detected digital signal of the scanning speed variation into an analog signal and outputs a scanning speed variation signal. The main cause of scanning speed variation is fluctuations in the scanning speed occurring every several scannings in the main scanning direction in the motor 105a which rotatingly drives the polygon mirror 105.

Figure 11:
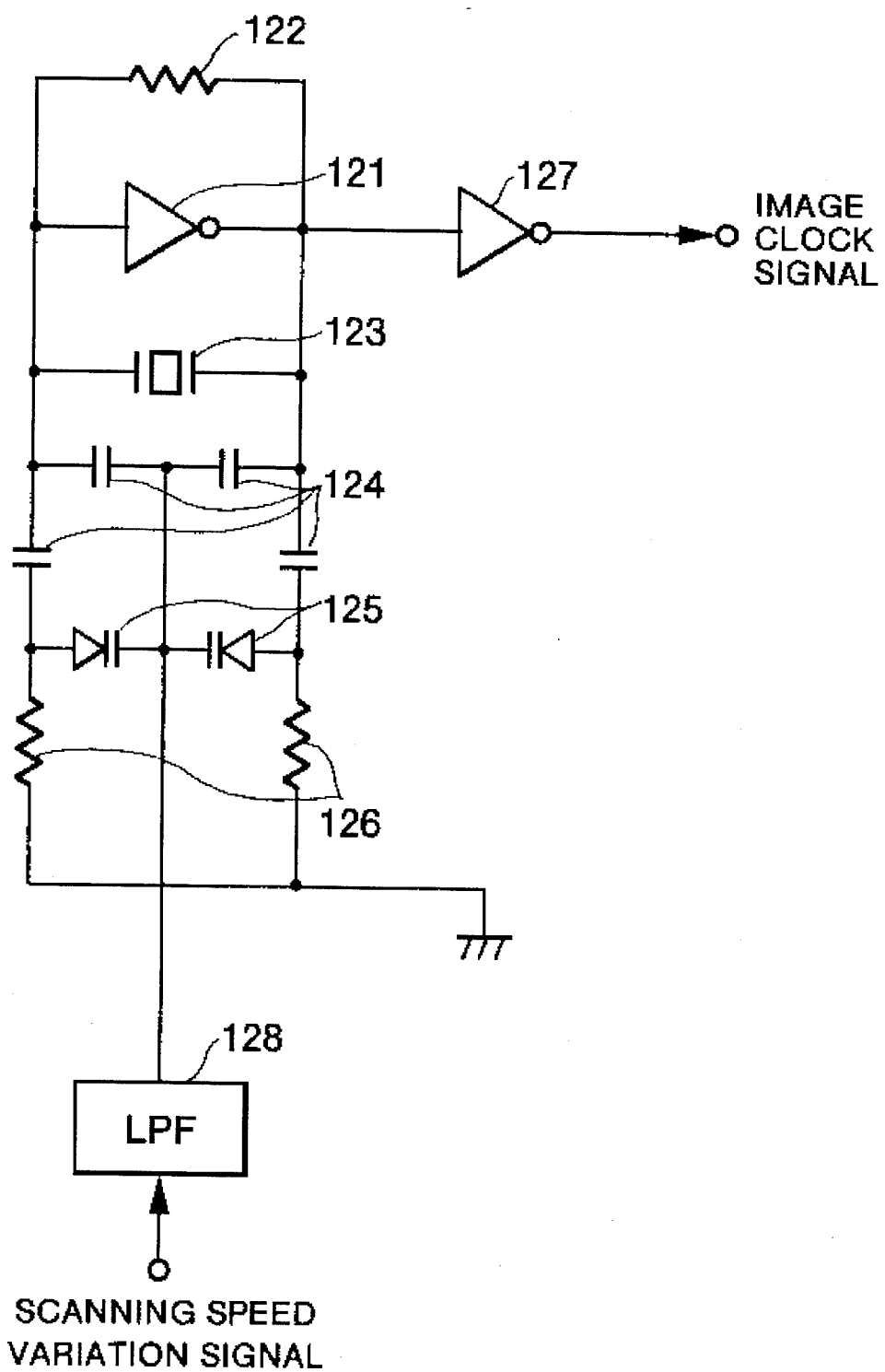
FIG. 11 shows a clock modulation circuit of the image exposure apparatus shown in FIG. 9.
Figure 12:
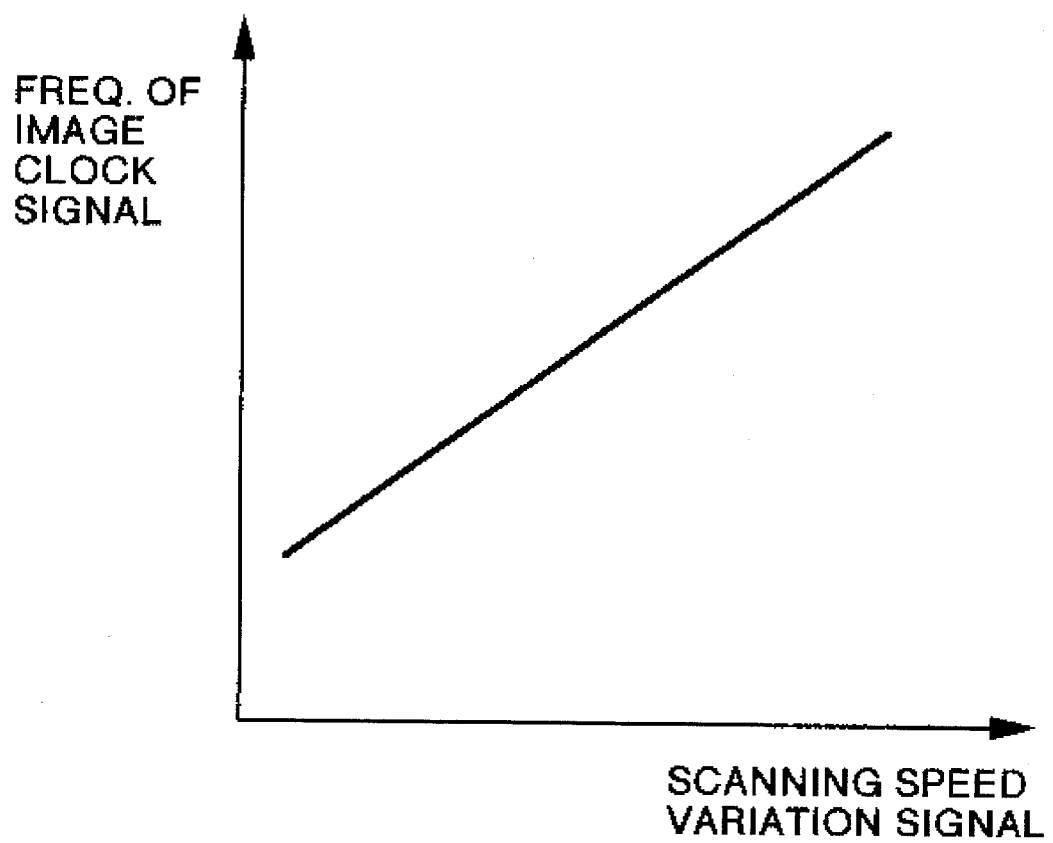
FIG. 12 is a graphical representation of the relationship between frequency of an image clock signal and a scanning speed variation signal.

A more detailed explanation of the clock modulation circuit 102 will be explained while referring to FIG. 11. The clock modulation circuit 102 includes an invertor 121, a resistor 122, a crystal oscillator 123, capacitors 124, variable capacitance diodes 125, resistors 126, and a voltage controlled crystal oscillator circuit (VCXO) made from an output buffer 127. The scanning speed variation signal is inputted to the oscillator circuit via a low-pass filter (LPF) 128.

The operation of the image exposure apparatus according to the second preferred embodiment of the present invention will be explained while referring to FIGS. 9 through 11. The laser beam scans the photosensitive drum 107 in a main scanning direction indicated by the arrow A. The beam detection circuit 111 provided adjacent in the main scanning direction (to the left in FIG. 9) to the photosensitive drum 107 detects the laser beam before scanning and exposure of the photosensitive drum 107 begins. Upon detecting the laser beam, the beam detection circuit 111 of the speed variation detecting circuit 101 outputs a BD signal, which starts transmission of the image signal. The BD signal from the beam detection circuit 111 is inputted to the counter circuit 113 whereupon the counter circuit 113 begins down counting from an appropriate initial value with each pulse of the clock signal inputted from the clock circuit 112. Each time a BD signal is inputted, the number of pulses counted at the counter circuit 113 is outputted to the D/A converter circuit 114, and the counter circuit again begins inversely counting the number of pulses from the clock signal starting from the appropriately high initial value. The D/A converter circuit 114 converts the number of inputted counted pulses into an analog voltage value, hereinafter referred to as a scanning speed variation signal, that reflects the cycle of the BD signal. For example, if the polygon mirror 105 rotates slowly, causing a long BD signal cycle, the voltage of the scanning speed variation signal will be low. Contrarily, if the polygon mirror 105 rotates rapidly, causing a short BD signal cycle, the voltage of the scanning speed variation signal will be large.

The scanning speed variation signal is inputted to the clock modulation circuit 102. As explained above, the clock modulation circuit 102 is a voltage controlled crystal oscillation circuit (VCXO) with oscillation frequency that changes according to the size of the inputted voltage as graphically shown in FIG. 12. That is, if the inputted voltage is small, the oscillation frequency is low, whereas if the inputted voltage is large, the oscillation frequency is high.

The polygon mirror 105 normally possess six to eight reflective surfaces. Although inter-surface angles and tilt angles of the surfaces are slightly inconsistent due to imprecise manufacturing, the frequency of the inconsistencies is much higher than that of the rotational variation of the polygon mirror 105 and so can be removed by the low-pass filter 128 of the clock modulation circuit 102 so as not to affect modulation of the scanning speed variation signal.

The scanning speed variation signal is modulated by the clock modulation circuit 102 into an oscillation output hereinafter referred to as the image clock signal. When the rotational speed of the polygon mirror 105 reduces and the speed variation signal lessens, the image clock signal frequency also lessens. Contrarily, when the rotational speed of the polygon mirror 105 increases and the speed variation signal increases, the image clock signal frequency also increases. This image clock signal is sent to the frame memory (not shown) and the like of the image signal apparatus. The image signals are read one by one based on the timing of the image clock signal and sent in order to the image signal modulation circuit 108. That is, the frequency of the image clock signal is modulated according to variation in the scanning speed of the laser beam. Therefore, the position the laser beam exposes on the photosensitive drum 107 stably matches the position indicated by the image signal. Since the position exposed by the laser beam is unaffected by changes in the scanning speed, positions exposed for each color precisely overlaps other colored positions when forming full-color images by repeatedly exposing the photosensitive drum 107 to the laser beam to develop the different colors.

Because the image clock signal frequency is modulated according to variation in scanning speed of the laser beam, exposed positions on the photosensitive drum 107 are compensated to match the image signal. For this reason, even if photosensitive drum 107 is repeatedly exposed to form a full-color image, because exposure positions of each color overlap precisely, a high quality full color image can be formed.

An image exposure apparatus constructed according to the second preferred embodiment modulates the frequency of the image clock signal according to variation in the scanning speed of the light beam. Therefore, positions exposed on the surface of the photosensitive drum are compensated to precisely correspond to those of the image signal. For this reason, even if photosensitive drum 107 is repeatedly exposed to form a full-color image, because exposure positions of each color overlap precisely, a high quality full color image can be formed.

Figure 8:
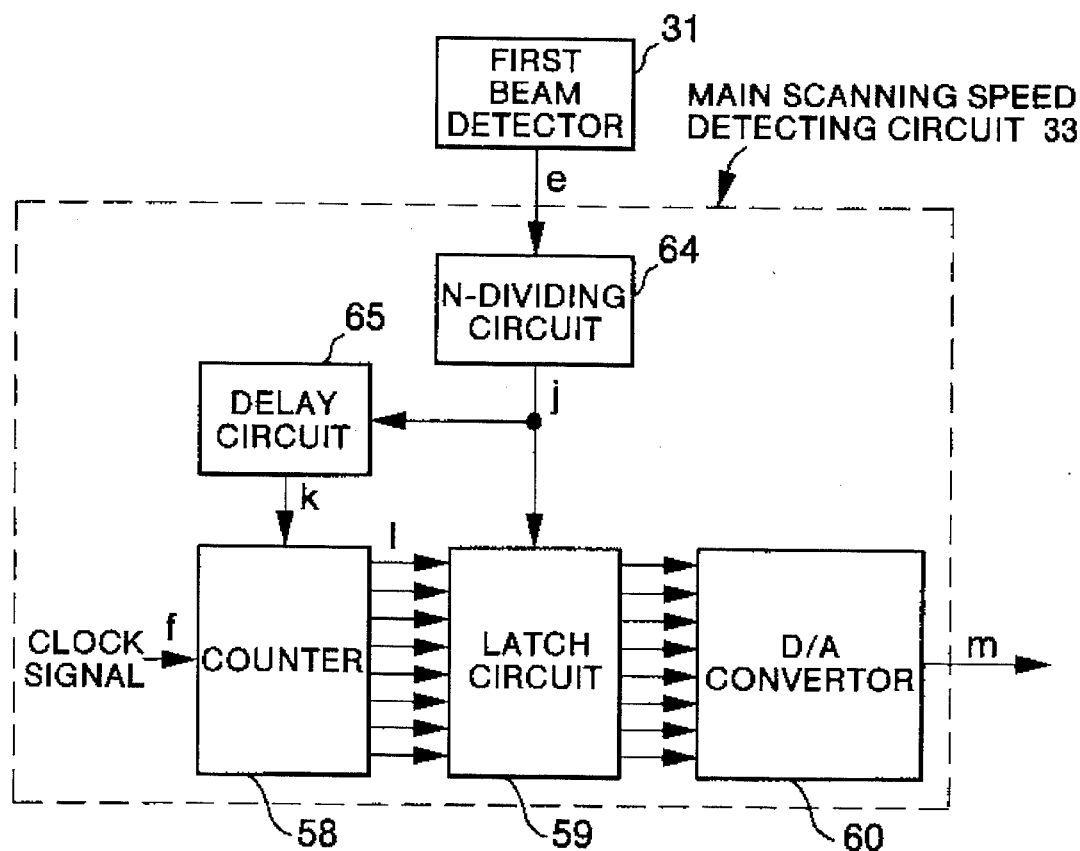
FIG. 8 is a block diagram showing a variation of the main scanning speed detection circuit shown in FIG. 7.
Figure 8:
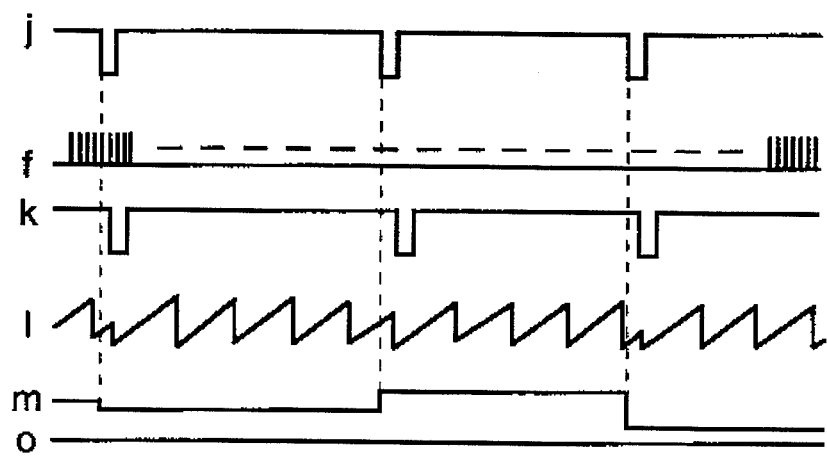

While the invention has been described in detail with reference to specific embodiments thereof, it would be apparent to those skilled in the art that various changes and modifications may be made therein without departing from the spirit of the invention. For example, as shown in FIG. 8, by adding an N-dividing circuit 64 (N represents the number of surfaces on the polygon mirror 42) and a delay circuit 65, the scanning speed in the main scanning direction can be detected by counting the number of clock pulses during the interval between receptions of light detected only at the first beam detector 31. With this construction, influences caused by angular deviation between different reflecting surfaces of the polygon mirror 42 can be deleted by counting the number of clock pulses during the interval of received light signals reflected at the same one surface of the polygon mirror 42. As an example, when the polygon mirror has six reflecting surfaces, the interval of the main scanning direction is 1 ms, and the clock frequency is 100 MHz, variation in rotation speed in the main scanning direction can be detected with an extremely high resolution of minimally 0.00017%.

If the variation of rotation varies by +/- a % when exposure is desired at a position L mm from the first beam detector 31 in the main scanning direction, the exposure position can only possibly change by the amount indicated in the following equation:

$$\Delta L = L \times (2 \times a / 100) \text{ mm.}$$

As an example, when rotation variation (a) is +/−0.001% at a position (L) 300 mm from the first beam detector 31, the change in the position actually exposed from the desired exposure position (ΔL) is only 6 μm. Thus, shifts in the exposure position are minimal so an extremely high quality image can be formed even when forming full color images that require repeated developing processes.

Also, rather than controlling the rotation of the polygon motor 44 only by the FG signal as described in the first preferred embodiment when the laser is turned OFF and only by the main scanning speed signal when the laser is ON, a separate beam detector can be provided for only detecting the scanning speed in the main scanning direction.

Although the present invention was described with the control loop formed by hardware, the polygon motor can also be controlled by a microcomputer with software that adds the deviation signal based on input of the FG signal from the polygon motor 44 and the clock signal.

The deflecting means was described as the polygon mirror 42 and the polygon motor 44, but these could be replaced by a hologram, and a motor for rotating the hologram.

Although in the second preferred embodiment, variation in the scanning speed of the laser beam was detected by measuring the cycle of the BD signal, installing a detector to the polygon mirror would obtain the same results.

What is claimed is:

1. An image exposure apparatus comprising:

a light source producing a light beam;

a photosensitive medium;

moving means for moving said photosensitive medium in an auxiliary scanning direction; and scanning means for scanning a light beam modulated according to an image signal in a main scanning direction orthogonal to the auxiliary scanning direction at a main scanning speed and irradiating the light beam onto said photosensitive medium, wherein said scanning means comprises:

deflecting means having an axis to be rotatable thereabout and deflecting the light beam in the main scanning direction;

means for rotating said deflecting means about the axis of said deflecting means at a rotational speed, said deflecting means repeatedly deflecting the light beam in the main scanning direction when rotated by said rotating means;

first main scanning speed variation detecting means for detecting a variation in the main scanning speed and producing a first main scanning speed variation signal indicative of the variation in the main scanning speed; and rotating controlling means for controlling the rotational speed of said deflecting means in accordance with the first main scanning speed variation signal;

second main scanning speed variation detecting means for detecting a variation in the main scanning speed and producing a second main scanning speed variation signal indicative of the variation in the main scanning speed; and image signal modulating means for modulating said light beam in accordance with the second main scanning speed variation signal.

2. An image exposure apparatus as claimed in claim 1, wherein said scanning means further comprises rotational variation detecting means for detecting a variation in the rotational speed of said deflecting means and producing a rotational speed variation signal indicative of the variation in the rotational speed of said deflecting means, and wherein said rotation controlling means controls the rotational speed of said deflecting means in further accordance with the rotational speed variation signal.

3. An image exposure apparatus as claimed in claim 2, wherein said main scanning speed variation detecting means comprises first detecting means for detecting the light beam at a start of scan of the light beam onto the photosensitive medium.

4. An image exposure apparatus as claimed in claim 3, wherein said main scanning speed variation detecting means further comprises second detecting means for detecting the light beam at an end of scan of the light beam onto the photosensitive medium.

5. An image exposure apparatus as claimed in claim 1, further comprising a clock modulation circuit that modulates said second main scanning speed variation signal into an image clock signal having a frequency that increases with the rotational speed of said deflecting means.

6. An image exposure apparatus as claimed in claim 5, further comprising an image signal modulation circuit that received an image signal based on said image clock signal that modulates a signal that causes modulation of said light beam.

7. An image exposure apparatus as claimed in claim 6, wherein said light source comprises a semiconductor laser and said signal that cause modulation is a driving signal for said semiconductor laser.

8. An image exposure apparatus comprising:

a light source producing a light beam;

a photosensitive medium;

moving means for moving said photosensitive medium in an auxiliary scanning direction; and scanning means for scanning said light beam modulated according to an image signal in a main scanning direction orthogonal to the auxiliary scanning direction at a main scanning speed and irradiating the light beam onto said photosensitive medium, wherein said scanning means comprises:

deflecting means having an axis to be rotatable thereabout and deflecting the light beam in the main scanning direction;

means for rotating said deflecting means about the axis of said deflecting means at a rotational speed, said deflecting means repeatedly deflecting the light beam in the main scanning direction when rotated by said rotating means;

main scanning speed variation detecting means for detecting a variation in the main scanning speed and producing a first main scanning speed variation signal indicative of the variation in the main scanning speed; and image signal modulating means for modulating said light beam in accordance with the main scanning speed variation signal.

9. An image exposure apparatus as claimed in claim 8, further comprising a clock modulation circuit that modulates said scanning speed variation signal into an image clock signal having a frequency that increases with the rotational speed of said deflecting means.

10. An image exposure apparatus as claimed in claim 9, further comprising an image signal modulation circuit that received an image signal based on said image clock signal that modulates a signal that causes modulation of said light beam.

11. An image exposure apparatus as claimed in claim 10, wherein said light source comprises a semiconductor laser and said signal that causes modulation is a driving signal for said semiconductor laser.

* * * * *